(12) United States Patent
McShea

(10) Patent No.: US 11,659,814 B2
(45) Date of Patent: May 30, 2023

(54) FURNITURE ANIMAL DETERRENT SYSTEM

(71) Applicant: Heather McShea, Tucson, AZ (US)

(72) Inventor: Heather McShea, Tucson, AZ (US)

( * ) Notice: Subject to any disclaimer, the term of this patent is extended or adjusted under 35 U.S.C. 154(b) by 48 days.

(21) Appl. No.: 15/886,180

(22) Filed: Feb. 1, 2018

(65) Prior Publication Data
US 2019/0230903 A1    Aug. 1, 2019

(51) Int. Cl.
*A01K 15/02*    (2006.01)
(52) U.S. Cl.
CPC .................. *A01K 15/023* (2013.01)
(58) Field of Classification Search
CPC .... A01K 15/023; A01K 15/029; A01K 15/04; A01K 15/021; A01K 15/00; A01M 29/00; A01M 29/22
USPC .......................................... 119/719
See application file for complete search history.

(56) References Cited

U.S. PATENT DOCUMENTS

| | | | | |
|---|---|---|---|---|
| 5,009,192 A * | 4/1991 | Burman | ............... | A01K 15/023 119/720 |
| 5,103,769 A * | 4/1992 | Macintosh | ........... | A01K 15/021 119/719 |
| 5,501,179 A * | 3/1996 | Cory | .................... | A01K 15/023 119/712 |
| 5,845,984 A * | 12/1998 | Bonilla | .................. | A01K 15/02 362/101 |
| 5,962,951 A * | 10/1999 | Bishop | .................. | B06B 1/0207 310/316.03 |
| 6,013,972 A * | 1/2000 | Face, Jr. | ................... | B24B 1/04 310/328 |
| 6,928,958 B2 * | 8/2005 | Crist | .................... | A01K 15/022 119/718 |
| 8,997,696 B1 * | 4/2015 | Wymer | ................. | A01M 29/00 119/712 |
| 9,295,230 B1 * | 3/2016 | Beck | ...................... | A01K 29/00 |
| 2002/0189551 A1 * | 12/2002 | Patterson | ............. | A01K 15/021 119/719 |
| 2003/0223816 A1 * | 12/2003 | Potts | ..................... | E01C 19/288 404/117 |
| 2006/0213449 A1 * | 9/2006 | Dodge | .................. | A01M 29/30 119/329 |
| 2007/0295283 A1 * | 12/2007 | Gick | .................... | A01K 15/021 119/707 |
| 2012/0137987 A1 * | 6/2012 | Moulin | ................ | A01K 15/023 119/719 |
| 2013/0174795 A1 * | 7/2013 | Lamkin | ................ | A01K 15/021 119/720 |
| 2013/0265165 A1 * | 10/2013 | So | ........................ | A01K 15/021 340/573.3 |
| 2014/0139183 A1 * | 5/2014 | Baschnagel, III | .... | H02J 7/0044 320/115 |
| 2014/0240890 A1 * | 8/2014 | Bradshaw | ............. | A01M 29/24 361/232 |

(Continued)

*Primary Examiner* — Magdalena Topolski
*Assistant Examiner* — Kevin M Dennis

(57) ABSTRACT

A furniture animal deterrent system for deterring pets from jumping, or lying, on furniture comprising a housing; a controller located within the housing; an animal presence sensor; a vibration device; and a multi-positional switch, movable between an off position, and at least two on positions relating to different vibration levels; wherein the animal presence sensor, the vibration device, and the multi-positional switch are operably connected to the controller within the housing.

13 Claims, 4 Drawing Sheets

(56) References Cited

U.S. PATENT DOCUMENTS

| | | | |
|---|---|---|---|
| 2014/0251233 A1* | 9/2014 | Bianchi | A01K 15/021 119/720 |
| 2014/0299071 A1* | 10/2014 | Wong | A01K 15/023 119/720 |
| 2014/0336263 A1* | 11/2014 | Krebs | A01M 31/002 514/627 |
| 2016/0007565 A1* | 1/2016 | Trottier | G05B 19/0428 119/51.02 |
| 2016/0015004 A1* | 1/2016 | Bonge, Jr. | A01K 29/005 119/718 |
| 2016/0081323 A1* | 3/2016 | Hudson | B65D 43/0222 119/713 |
| 2016/0100552 A1* | 4/2016 | So | A01K 15/021 119/719 |
| 2016/0135429 A1* | 5/2016 | James | A01K 15/02 119/719 |
| 2016/0235040 A1* | 8/2016 | Beck | A01K 27/003 |
| 2017/0008604 A1* | 1/2017 | Buster | B63C 11/26 |
| 2017/0208775 A1* | 7/2017 | Van Curen | A01K 15/022 |
| 2018/0186618 A1* | 7/2018 | chow | H04L 67/42 |
| 2018/0368365 A1* | 12/2018 | Van Curen | A01K 15/021 |
| 2019/0027994 A1* | 1/2019 | Chang | H02K 7/116 |
| 2019/0069518 A1* | 3/2019 | Falbaum | A01K 15/025 |
| 2019/0124887 A1* | 5/2019 | Seppala | A01M 29/24 |
| 2019/0254258 A1* | 8/2019 | Lill | A01M 29/18 |

* cited by examiner

FURNITURE ANIMAL DETERRENT SYSTEM

TECHNICAL FIELD OF THE INVENTION

The present invention relates to the field of animal deterrents. In particular, the present invention relates to a system for deterring an animal from climbing on indoor or outdoor furniture.

BACKGROUND OF THE INVENTION

Existing products and patents have attempted to accomplish the same deterrent to animals, however they are unsightly and need to be removed from the furniture is the pet owner wants to sit on or use the couch, chair, or bed. Other existing patents and products provide a deterrent that emits loud noises or sprays liquid on or near the animal to discourage them from jumping on furniture. These devices frighten the animal and can damage furniture that the pet is being deterred from jumping or lying on. Additionally, other existing devices have to be removed from the furniture when a pet owner wishes to use the furniture, therefore providing no use in deterring the animal from jumping on or laying on furniture while the owner is using the furniture.

The present invention solves the above mentioned issues with existing devices by providing a furniture animal deterrent system that uses a vibrating mechanism to produce a strong vibration, yet is small enough to be placed under a couch or chair cushion or tucked between cushions making it unseen yet effective. The vibration is not unpleasant for the owner of the animal, yet is unpleasant enough to the animal to discourage them from wanting to jump or lay on furniture. Additionally, the present invention does not have to be removed from the furniture for the owner to use it.

Any discussion of prior art throughout the specification should in no way be considered as an admission that such prior art is widely known or forms part of the common general knowledge in the field.

BRIEF SUMMARY OF THE INVENTION

According to the present invention there is provided a furniture animal deterrent system comprising a housing; a controller located within the housing; an animal presence sensor; a vibration device; and a multi-positional switch, movable between an off position, and at least two on positions relating to vibration levels; wherein the animal presence sensor, the vibration device, and the multi-positional switch are electrically connected to the controller.

The animal presence sensor is preferably an accelerometer to activate the vibration device when movement is detected. The vibration device is preferably comprised of a vibration motor controlled by a stepper motor driver. The stepper motor driver is preferably structured and arranged to allow at least two different vibration intensities of the vibration motor. In an alternate embodiment, the animal presence sensor is further comprised of a pressure switch to activate said vibration device.

The furniture animal deterrent system preferably further comprises at least one LED light attached to the controller to externally visually indicate the level of vibration intensity when the animal furniture deterrent system is activated. The furniture animal deterrent system can be coupled with a wireless communication system such as Bluetooth so that it is activated and deactivated with a mobile device.

BRIEF DESCRIPTION OF THE DRAWINGS

The preferred embodiment of the present invention will now be described, by way of example only, with reference to the accompanying drawings in which.

DETAILED DESCRIPTION OF THE INVENTION

The foregoing and other objectives, features, and advantages of the invention will be more readily understood upon consideration of the following description of the invention taken in conjunction with the accompanying drawings.

Figure 1:
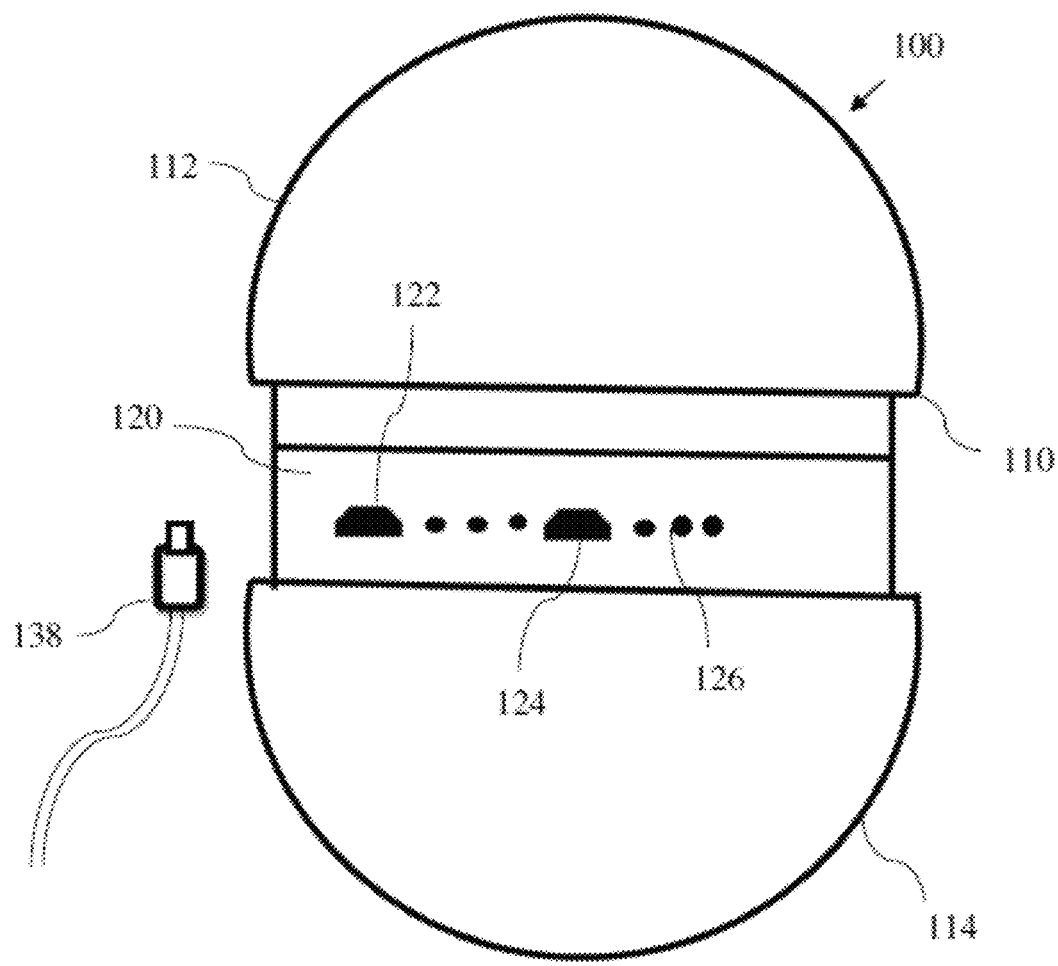
FIG. 1 shows a perspective view of a furniture animal deterrent system according to a preferred embodiment of the invention.

Now referring to the drawings, FIG. 1 shows a furniture animal deterrent system 100 preferably comprising a housing 110; a controller preferably located within the housing; an animal presence sensor; a vibration device; and a multi-positional switch, movable between an off position, and at least two on positions relating to vibration levels; wherein the animal presence sensor, the vibration device, and the multi-positional switch are electrically connected to the controller. Additionally, a power source, such as a rechargeable battery, is preferably electrically coupled to the controller.

As further shown in FIG. 1, the housing 110 is preferably a spherical shape comprised of a soft flexible plastic material, and preferably comprises a top half 112 and a bottom half 114. The top half 112 is preferably removably attached to the bottom half 114 to allow access to the controller and power source inside the housing. Alternately preferably, the housing is an ellipsoid shape. Preferably, the bottom half of the housing further comprises a series of compartments structured and arranged to hold the controller, the vibration device, and battery pack.

Preferably, the removable attachment is a helical spiral attachment where the top half 112 is rotated about the threads of the bottom half 114. Alternately preferably, the removable attachment is a snap-together arrangement where the top half 112 snaps onto the bottom half 114. The portion of the housing where the top half and the bottom half are removably attached is preferably a narrow strip 120 where there is a plurality of apertures. The plurality of apertures correspond to a charging port 122, a switch 124, and at least one LED light 126. Alternately preferably, the housing material is semi-transparent to allow the at least one LED light 126 to shine through the housing material and be visible.

The housing 110 is preferably approximately 11" (eleven inches) in circumference and 3.5" (three and a half inches) in diameter. However, the device may be bigger or smaller depending on the furniture the device will be used with and/or the components inside the housing electrically connected to the controller.

Figure 2:
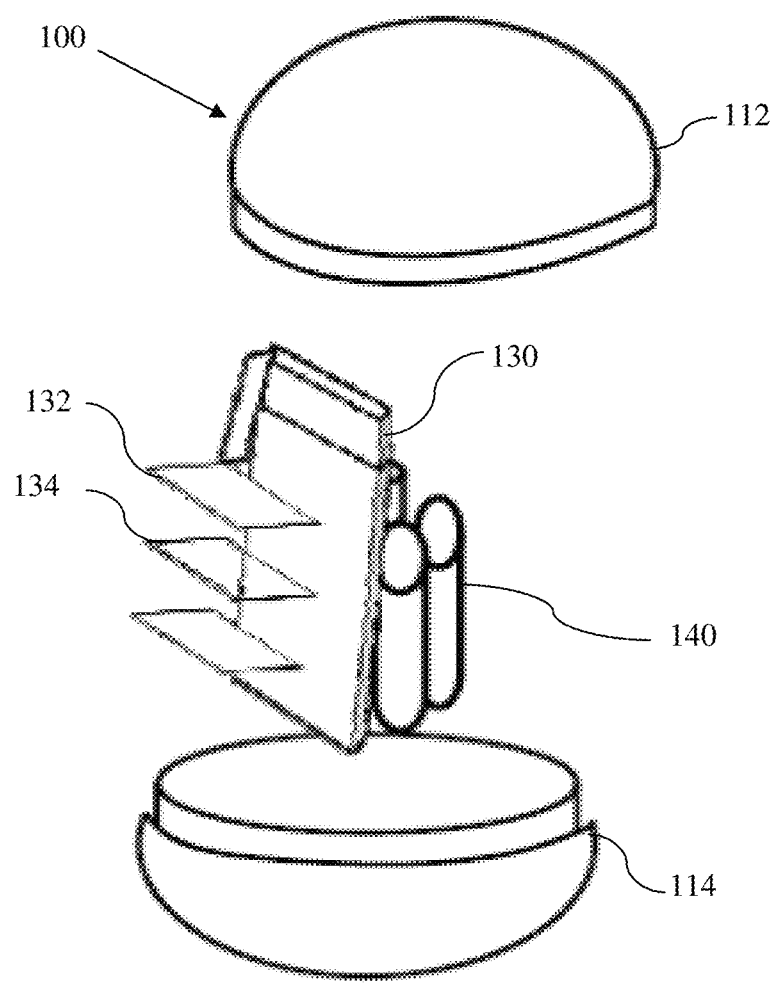
FIG. 2 shows an exploded perspective view of a furniture animal deterrent system as placed on a piece of furniture according to a preferred embodiment of the invention.

As shown in FIG. 2, a controller 130 is seated within the housing bottom half 114 and is electrically connected to a power supply 132. The power supply 132 is preferably at least one rechargeable battery and a charging port. The at least one rechargeable battery preferably is recharged by using a mobile device charging cord 138 that plugs into the controller charging port through the plurality of apertures in the housing described above. Alternately preferably, the power supply includes a power cord connected to a household power source.

As further shown in FIG. 1, a multi-positional switch 124 is preferably electrically connected between the controller and the power supply where the multi-positional switch is preferably movable between an off position, and at least two ON positions relating to vibration levels, specifically a first ON position and a second ON position. In the off position, the switch is open not allowing electrical power to the controller. In the at least two on positions the multi-positional switch is closed providing electrical power to the controller. The first ON position is related to the lowest vibration intensity of the vibration device. The second ON position is related to the next higher vibration intensity of the vibration device. Each successive ON position will preferably relate to increasing vibration intensity level of the vibration device.

As further shown in FIG. 2, an animal presence sensor 134 is preferably electrically coupled to the controller 130. The animal presence sensor 134 is preferably an accelerometer configured to detect movement of the furniture, such as when the presence of an animal on the designated furniture causes the cushions to move. When movement is detected on the designated furniture, such as when an animal jumps onto the furniture and causes the cushion to move against the housing 110, the accelerometer provides a signal to the controller 130 to activate a vibration device 140. Alternately preferably, the animal presence sensor 134 is a pressure switch configured to send a signal to the controller and activate the vibration device when the animal presence sensor detects pressure of a cushion against the housing 110 of the device.

Figure 3:
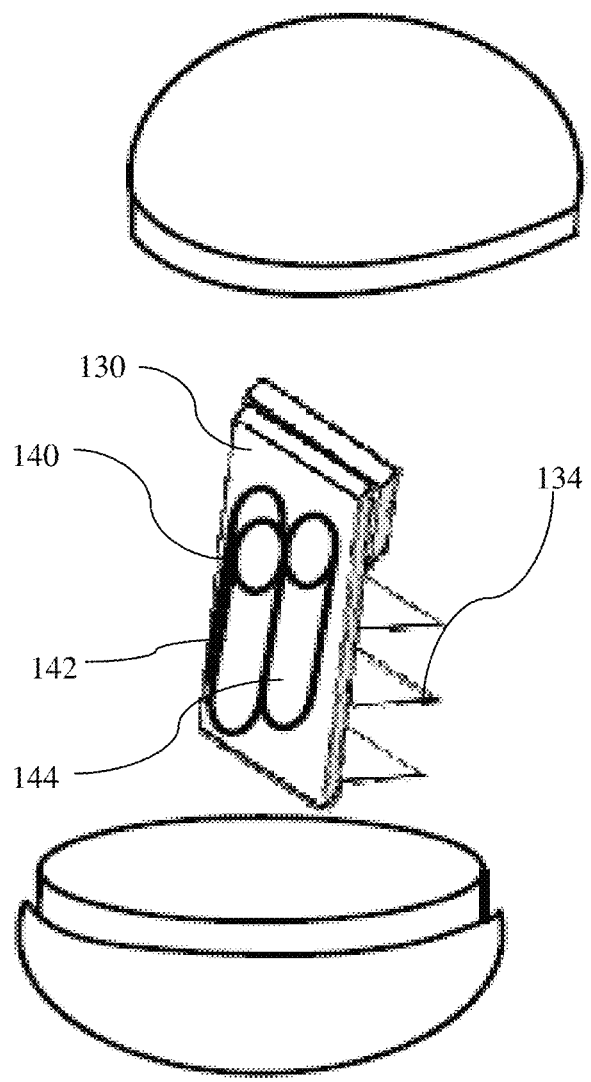
FIG. 3 shows an exploded perspective view of a furniture animal deterrent system according to a preferred embodiment of the present invention.

As shown in FIG. 3, the vibration device 140 is preferably comprised of a vibration motor 142 connected to a stepper motor driver 144. Both the vibration motor and the stepper motor driver are electrically connected to the controller 130. The stepper motor driver 142 is preferably structured and arranged to control the vibration motor 142. Preferably, the user can select one of at least two different intensity levels of the vibration motor through the at least one switch.

When activated, the user selects the intensity level of the vibration using the at least one multi-position switch, and the controller 130 outputs a pulse signal to the stepper motor driver 144 which further controls the speed of the vibration motor 142 which controls the level of vibration intensity when motion is detected through the animal presence sensor 134. When the animal presence sensor 134 detects an animal on the designated furniture, the controller 130 activates the stepper motor driver 144 and the vibration motor 142 to provide vibration of the entire animal furniture deterrent system 100 and through the furniture to discourage the animal from jumping on, or staying on, the furniture. After about 30 seconds of activation, the controller 130 deactivates the signal output to the stepper motor driver, stopping the vibration device and the vibration output and resetting the animal presence sensor.

As further shown in FIG. 1, the at least one LED light 126 is preferably attached to the controller 130 and extends through a plurality of apertures of the housing 110 such that the user can visually see the at least one LED light from the outside of the housing 110. The at least one LED light is related to the level of vibration intensity selected when the animal furniture deterrent system 100 is activated. The at least one LED light 126 is preferably further comprised of different colors relating to the different vibration intensity levels of the vibration motor. Alternately preferably, there are at least two LED lights for each intensity level, preferably located on the narrow strip of housing where the upper half and the lower half removably attach, where one each of the at least two LED lights are located one on opposite sides of the multi-positional switch.

As further shown in FIG. 1, the at least one LED light 126 is preferably used to visually identify the vibration intensity level of the vibration device when the animal furniture deterrent system is activated. When the multi-positional switch 124 is preferably placed in the first ON position then at least one of the at least one LED light 126 is illuminated. Further, when the multi-positional switch 124 is preferably placed in the second ON position then two of the at least one LED light 126 are illuminated. When the multi-positional switch is placed in an ON position related to higher vibration intensity levels more LED lights are illuminated relating to the vibration intensity levels. For example, with a push button switch a user would push the button once for the first ON position, twice for the second ON position, etc.

As further shown in FIG. 1, the multi-positional switch 124 preferably extends through the housing 110 through one of the plurality of apertures to be accessed from the outside of the housing. The multi-positional switch is preferably a push button, slide switch, toggle switch, or other switches which perform the same functions of turning on and off the power to the controller with at least two on positions.

Figure 4:
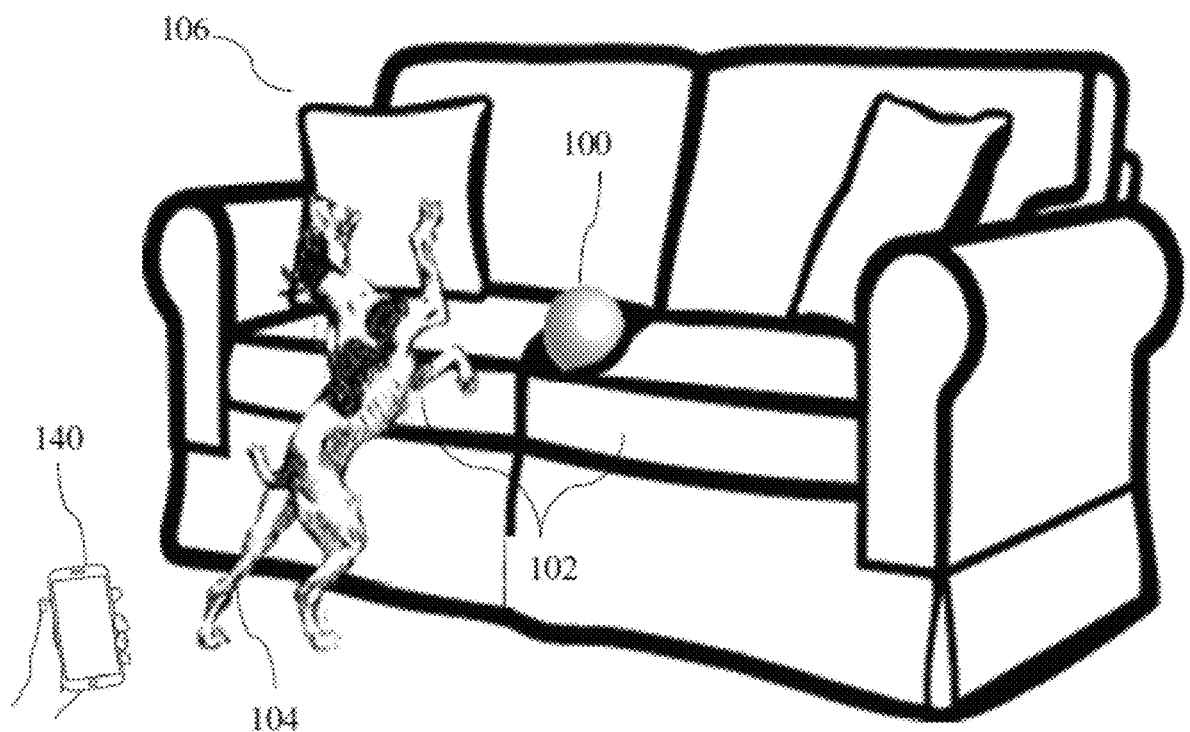
FIG. 4 shows a perspective view of a furniture animal deterrent system in use deterring an animal from getting on furniture.

As shown in FIG. 4, the furniture animal deterrent system 100 is preferably placed within the cushions 102 of a couch or chair that the user would like to prevent an animal 104 from getting on. When the animal 104 jumps or attempts to climb on the furniture 106 that the animal furniture deterrent system is placed on, the animal presence sensor detects the presence of the animal and activates the vibration device. The vibration device provides a vibration through the cushions of the furniture 106 which can be felt by the animal to discourage the animal 104 from continuing onto the furniture or cause the animal to get off the furniture.

Preferably, the furniture animal deterrent system can be coupled with a wireless communication system, such as Bluetooth. The wireless communication system preferably allows the animal furniture deterrent system to be activated with a mobile device 140. Preferably, the mobile device 140 would comprise an application configured to control the activation of the furniture animal deterrent system. The application would further comprise selections such as ON/OFF and selecting the intensity level of the vibration motor.

Although the present invention has been described by way of example, it should be appreciated that variations and modifications may be made without departing from the scope of the invention. Furthermore, where known equivalents exist to specific features, such equivalents are incorporated as if specifically referred to in this specification.

I claim:

1. A furniture animal deterrent system comprising:
a housing configured to be placed on a piece of furniture;
a controller, an animal presence sensor, and a non-wearable vibration device located within the housing; and
a multi-positional switch disposed on an outside surface of the housing and configured to move between an off position, a first position, and a second position;

wherein the animal presence sensor, the non-wearable vibration device, and the multi-positional switch are electrically connected to the controller in the housing, wherein the animal presence sensor is an accelerometer or pressure sensor configured to detect an animal on the piece of furniture when the piece of furniture moves against or changes a pressure against the housing;

wherein, in response to the animal presence sensor detecting the animal physically positioned on the piece of furniture upon which the housing is placed, the non-wearable vibration device is engaged to cause the piece of furniture to vibrate, wherein, in response to the animal presence sensor detecting the animal is no longer physically positioned on the piece of furniture, the non-wearable vibration device is disengaged and no longer emits the vibration that causes the piece of furniture to vibrate, and wherein the first position of the multi-positional switch correlates to a first vibration level and the second position of the multi-positional switch correlates to a second vibration level that is higher than the first vibration level.

2. The furniture animal deterrent system of claim 1, wherein the non-wearable vibration device comprises a vibration motor controlled by a stepper motor driver.

3. The furniture animal deterrent system of claim 2, wherein the stepper motor driver is configured to allow the vibration motor to operate at the first vibration level or the second vibration level.

4. The furniture animal deterrent system of claim 1, further comprising a wireless communication system configured to allow the furniture animal deterrent system to be activated with a mobile device.

5. The furniture animal deterrent system of claim 1, further comprising at least one LED light attached to the controller and configured to provide a visual indication as to whether the multi-positional switch is set to the first vibration level or the second vibration level when the furniture animal deterrent system is activated.

6. The furniture animal deterrent system of claim 1, wherein the housing comprises a soft, semi-flexible plastic material.

7. The furniture animal deterrent system of claim 4 wherein the mobile device is a remote control configured to activate the animal presence sensor and set the first vibration level or the second vibration level.

8. A furniture animal deterrent system comprising:
a housing configured to be placed on a piece of furniture;
a controller, an animal presence sensor, and a non-wearable vibration device located within the housing;
a rechargeable battery configured to be charged with a mobile device cord; and
a multi-positional switch disposed on an outside surface of the housing and configured to move between an off position, a first position, and a second position;

wherein the animal presence sensor, the non-wearable vibration device, and the multi-positional switch are electrically connected to the controller in the housing, wherein the animal presence sensor is an accelerometer or pressure sensor configured to detect an animal on the piece of furniture when the piece of furniture moves against or changes a pressure against the housing;

wherein, in response to the animal presence sensor detecting the animal physically positioned on the piece of furniture upon which the housing is placed, the non-wearable vibration device is engaged to cause the piece of furniture to vibrate, wherein, in response to the animal presence sensor detecting the animal is no longer physically positioned on the piece of furniture, the non-wearable vibration device is disengaged and no longer emits the vibration that causes the piece of furniture to vibrate, and wherein the first position of the multi-positional switch correlates to a first vibration level and the second position of the multi-positional switch correlates to a second vibration level that is higher than the first vibration level.

9. The furniture animal deterrent system of claim 8, wherein the non-wearable vibration device comprises a vibration motor controlled by a stepper motor driver.

10. The furniture animal deterrent system of claim 9, wherein the stepper motor driver is configured to allow the vibration motor to operate at the first vibration level or the second vibration level.

11. The furniture animal deterrent system of claim 8, further comprising a wireless communication system configured to allow the furniture animal deterrent system to be activated with a mobile device.

12. The furniture animal deterrent system of claim 8, further comprising at least one LED light attached to the controller and configured to provide a visual indication as to whether the multi-positional switch is set to the first vibration level or the second vibration level when the furniture animal deterrent system is activated.

13. The furniture animal deterrent system of claim 8, wherein the housing comprises a soft, semi-flexible plastic material.

\* \* \* \* \*